United States Patent
Oh et al.

(10) Patent No.: US 11,817,932 B2
(45) Date of Patent: Nov. 14, 2023

(54) SPATIAL MULTIPLEXING METHOD AND DEVICE USING POLARIZED WAVE IN MULTIBEAM SYSTEM

(71) Applicant: KMW INC., Hwaseong-si (KR)

(72) Inventors: Tae Youl Oh, Hwaseong-si (KR); Joon Hyong Shim, Yongin-si (KR); Min Seon Yun, Anyang-si (KR); Jae Young Choi, Yongin-si (KR); Kyung Hoon Kwon, Incheon (KR); Young Chan Moon, Suwon-si (KR); Oh Seog Choi, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 67 days.

(21) Appl. No.: 17/513,926

(22) Filed: Oct. 29, 2021

(65) Prior Publication Data
US 2022/0052750 A1   Feb. 17, 2022

Related U.S. Application Data

(63) Continuation of application No. PCT/KR2020/017421, filed on Dec. 2, 2020.

(30) Foreign Application Priority Data

Dec. 5, 2019   (KR) .................. 10-2019-0160606
Apr. 16, 2020   (KR) .................. 10-2020-0046256

(51) Int. Cl.
*H04B 7/06*   (2006.01)
*H04B 7/0456*   (2017.01)
(Continued)

(52) U.S. Cl.
CPC ......... *H04B 7/0697* (2013.01); *H04B 7/0469* (2013.01); *H04B 7/10* (2013.01); *H04B 7/0408* (2013.01); *H04L 5/0007* (2013.01)

(58) Field of Classification Search
CPC .................................................... H04B 7/0697
(Continued)

(56) References Cited

U.S. PATENT DOCUMENTS

2013/0121342 A1   5/2013   Kim
2016/0337056 A1*  11/2016   Frenne .................. H04W 24/10
(Continued)

FOREIGN PATENT DOCUMENTS

JP   2009-225013 A   10/2009
KR   10-2013-0053797 A   5/2013
(Continued)

OTHER PUBLICATIONS

International Search Report for PCT/KR2020/017421 dated Mar. 9, 2021 and its English translation.
(Continued)

*Primary Examiner* — Lihong Yu
(74) *Attorney, Agent, or Firm* — INSIGHT LAW GROUP, PLLC; Seung Lee

(57) ABSTRACT

Disclosed are a spatial multiplexing method and apparatus using polarization in a multi-beam system.
As the spatial multiplexing method using polarization in a multi-beam system, an embodiment of the present invention provides a spatial multiplexing method including determining different phases and different polarizations to be applied to a first beam and a second beam, precoding a signal so that the first beam and the second beam have the determined different phases, and converting polarization of the precoded signal so that the first beam and the second beam have the determined different polarizations.

10 Claims, 5 Drawing Sheets

(51) Int. Cl.
  *H04B 7/10*   (2017.01)
  *H04B 7/0408* (2017.01)
  *H04L 5/00*   (2006.01)

(58) Field of Classification Search
  USPC ........................................................ 375/267
  See application file for complete search history.

(56) References Cited

U.S. PATENT DOCUMENTS

2018/0205436 A1   7/2018   Gil et al.
2019/0296803 A1   9/2019   Fourie

FOREIGN PATENT DOCUMENTS

KR   10-2017-0041115 A   4/2017
KR   10-2019-0122442 A   10/2019

OTHER PUBLICATIONS

Park, Jaehyun et al., "Multi-User Linear Precoding for Multi-Polarized Massive MIMO System Under Imperfect CSIT," IEEE Transaction on Wireless Communications, vol. 14, Issue 5, May 2015, Jan. 6, 2015.

Kt, "On the need of antenna grouping schemes for massive MIMO", R1-160968, Feb. 6, 2016., 3GPP TSG RAN WG1 Meeting #84.

Non-final office action dated Oct. 25, 2022 from the Japanese Patent Office for Japanese Application No. 2021-562845 and its English translation.

* cited by examiner

SPATIAL MULTIPLEXING METHOD AND DEVICE USING POLARIZED WAVE IN MULTIBEAM SYSTEM

CROSS-REFERENCE TO RELATED APPLICATION

This application is a continuation of PCT Application PCT/KR2020/017421, filed on Dec. 2, 2020, which claims priority to and the benefit from Korean Patent Applications No. 10-2019-0160606, filed on Dec. 5, 2019 and No. 10-2020-0046256, filed on Apr. 16, 2020, the disclosure of which is incorporated herein by reference in their entirety.

TECHNICAL FIELD

The present invention relates to a method and apparatus for implementing spatial multiplexing, and more particularly, to a spatial multiplexing method and apparatus using polarization in a system using multiple beams which are capable of improving communication quality by minimizing interference between polarizations.

BACKGROUND

Description in this section merely provides background information of the present invention and does not constitute the conventional art.

In a system using multiple beams (e.g., a massive multiple-input and multiple-output (MIMO) system), a correlation coefficient between wireless channels increases due to interference between adjacent beams-, and for this reason, it is not possible to efficiently use spatial resources.

Recently, antenna modules having different polarizations are being employed in a multi-beam system so that adjacent beams may use different polarizations. In this way, interference between adjacent beams is reduced.

However, this method involves separately configuring an antenna module for each of the polarizations to be used. Accordingly, the manufacturing process is complicated and requires much time and money. Also, since this method involves separately configuring an antenna module for each of the polarizations to be used, antenna size may be increased.

SUMMARY

Technical Problem

The present invention is directed to providing a method and apparatus capable of reducing interference between adjacent beams by changing a phase of in-phase/quadrature-phase (I/Q) data in a baseband using orthogonal polarizations of antennas and by applying different polarizations to a plurality of beams used for spatial multiplexing.

Technical Solution

One aspect of the present invention provides a spatial multiplexing method using polarization in a multi-beam system, the method including determining different phases and different polarizations to be applied to a first beam and a second beam, precoding a signal so that the first beam and the second beam have the determined different phases, and converting polarization of the precoded signal so that the first beam and the second beam have the determined different polarizations.

Another aspect of the present invention provides a spatial multiplexing apparatus using polarization in a multi-beam system, the apparatus including a control unit configured to determine different phases and different polarizations to be applied to a first beam and a second beam, a beamforming unit configured to precode a signal so that the first beam and the second beam have the determined different phases, and a multi-polarization synthesis unit configured to convert polarization of the precoded signal so that the first beam and the second beam have the determined different polarizations.

Advantageous Effects

As described above, according to an embodiment of the present invention, adjacent beams have different polarizations, and thus interference between the adjacent beams is reduced. Accordingly, communication quality can be improved.

Also, according to another embodiment of the present invention, the orthogonality between wireless channels is increased, and thus the channel capacity of a system can be increased.

DETAILED DESCRIPTION

Figure 1:
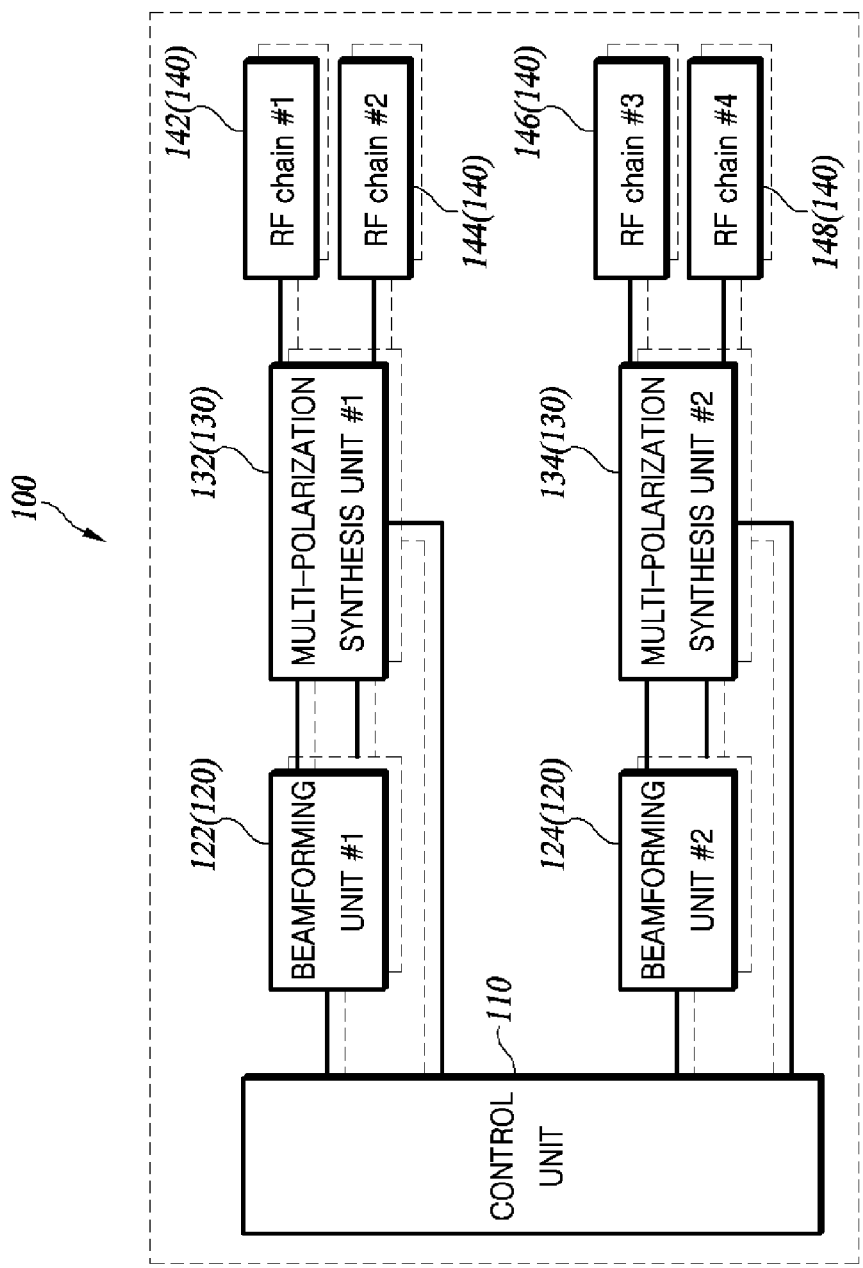
FIG. 1 is an exemplary block diagram of a spatial multiplexing apparatus for implementing technologies of the present disclosure.

Hereinafter, some embodiments of the present invention will be described in detail with reference to illustrative drawings. In adding reference numerals to elements of each drawing, identical elements are referred to by the same reference numeral as much as possible even when the elements are depicted in different drawings. In describing the present invention, when it is determined that the detailed description of a related known configuration or function may obscure the gist of the present invention, the detailed description will be omitted.

Also, in describing elements of the present invention, terms including first, second, A, B, (a), (b), etc. may be used. The terms are used to just distinguish an element from other elements and the essence, sequence, order, or the like of the elements is not limited by the terms. Throughout the specification, when a part is referred to as "including" or "having" an element, it does not preclude another element and may further include another element unless specifically stated otherwise. As used herein, the term "unit," "module," or the like refers to a unit for processing at least one function or operation, which may be implemented by hardware, software, or a combination of hardware and software.

The present invention provides a method and apparatus for generating or setting various polarizations by changing a phase of in-phase/quadrature-phase (I/Q) data in a baseband, using orthogonal polarizations of antennas.

Also, the present invention provides a method and apparatus for increasing the orthogonality between wireless channels and the channel capacity of a system by configuring adjacent beams to use different polarizations for the purpose of spatial multiplexing in a mobile communication system using multiple beams (a multi-beam system, e.g., a massive multiple-input and multiple-output (MIMO) system).

An example of a spatial multiplexing apparatus 100 for implementing such methods is shown in FIG. 1. A configuration of the spatial multiplexing apparatus 100 and a spatial multiplexing method using the spatial multiplexing apparatus 100 will be described below with reference to FIGS. 1 and 2.

The spatial multiplexing apparatus 100 may be installed in at least one of a base station, a relay, and a terminal. As shown in FIG. 1, the spatial multiplexing apparatus 100 may include a control unit 110, beamforming units 120, multi-polarization synthesis units 130, and radio frequency (RF) chains 140. The RF chains 140 may include an RF block (not shown) and an orthogonal polarization antenna module. The RF block (not shown) may include a digital-to-analog converter (DAC)/analog-to-digital converter (ADC), a filter, a mixer, and the like.

The number of beamforming units 120, the number of multi-polarization synthesis units 130, and the number of RF chains 140 may be larger than or equal to those shown in FIG. 1. For example, in the case of implementing spatial multiplexing using a larger number of beam patterns (beams), the beamforming units 120, the multi-polarization synthesis units 130, and the RF chains 140 may be included in the spatial multiplexing apparatus 100 in larger numbers than those shown in FIG. 1.

The control unit 110 may set or determine phases and polarizations of beams to be emitted through the RF chains 140.

The control unit 110 may differently set or determine the phases of the beams. For example, when n (n is a natural number of 2 or more) beams are used for spatial multiplexing, the control unit 110 may differently determine phases of then beams. The phases determined by the control unit 110 may be used for beamforming in the beamforming units 120.

Also, the control unit 110 may determine different polarizations (different types of polarizations) for adjacent beams (neighboring each other) in a space among a plurality of beams. For example, when the number of beams to be used for spatial multiplexing is n (n is a natural number of 2 or more), the control unit 110 may differently set or determine a $k^{th}$ beam and a $l^{th}$ beam which neighbor each other.

The beamforming units 120 may precode a baseband signal or data (S240).

The beamforming units 120 may generate the beams (beamforming) determined by the control unit 110 by applying a weight vector to the baseband signal. Since the beamforming units 120 precode the signals so that each of the beams may have the phase determined by the control unit 110, the beams may have different phases due to operations of the beamforming units 120.

The multi-polarization synthesis units 130 may convert polarizations of the precoded signals (S250).

The multi-polarization synthesis units 130 may convert the polarizations of the precoded signals through a conversion process (synthesis or decomposition), which will be described below, so that the neighboring beams in the space may have different polarizations (the polarizations determined by the control unit).

Meanwhile, the baseband signal which is a target of processing may be subjected to a scrambling process S210, a modulation process S220, a layer mapping process S230, etc. before being processed by the beamforming units 120.

The scrambling process S210 is a process of encrypting the baseband signal using a scramble signal to distinguish a base station or user equipment (UE). The spatial multiplexing apparatus 100 may further include a scramble module (not shown) for performing the scrambling process S210.

The modulation process S220 is a process of modulating the scrambled signals into a plurality of modulation symbols. The spatial multiplexing apparatus 100 may further include a modulation module or a modulation mapper (not shown) for performing the modulation process S220.

The signal scrambled in the process S210 may be input to the modulation mapper (not shown) and modulated with a binary phase shift keying (BPSK), quadrature phase shift keying (QPSK), or 16 quadrature amplitude modulation (QAM)/64QAM scheme according to the type of the signal and/or a channel state.

The layer mapping process S230 is a process of mapping the modulation symbols to one or more transmission layers so as to separate the signals according to antennas. The spatial multiplexing apparatus 100 may further include a layer mapper (not shown) for performing the layer mapping process S230.

The spatial multiplexing apparatus 100 may further perform a process S260 of mapping the modulation symbols obtained through the modulation process S220 to resource elements (i.e., frequencies). To this end, the spatial multiplexing apparatus 100 may further include a resource element mapping unit (not shown), and the process S260 of mapping the modulation symbols to resource elements may be performed by the resource element mapping unit (not shown).

The spatial multiplexing apparatus 100 may perform an inverse fast Fourier transform (IFFT) operation to generate time-domain symbols for the polarization-converted signals. Also, the spatial multiplexing apparatus 100 may insert guard intervals to prevent inter-symbol interference (ISI) (S270). To this end, the spatial multiplexing apparatus 100 may further include an IFFT unit (not shown) and a cyclic prefix (CP).

The signals which have passed through the processes S210 to S270 may be emitted in the form of a beam through the RF chains 140. As described above, beams emitted according to the spatial multiplexing method of the present invention have different phases in a space, and among the beams having different phases, two adjacent beams may have different polarizations.

Figure 3:
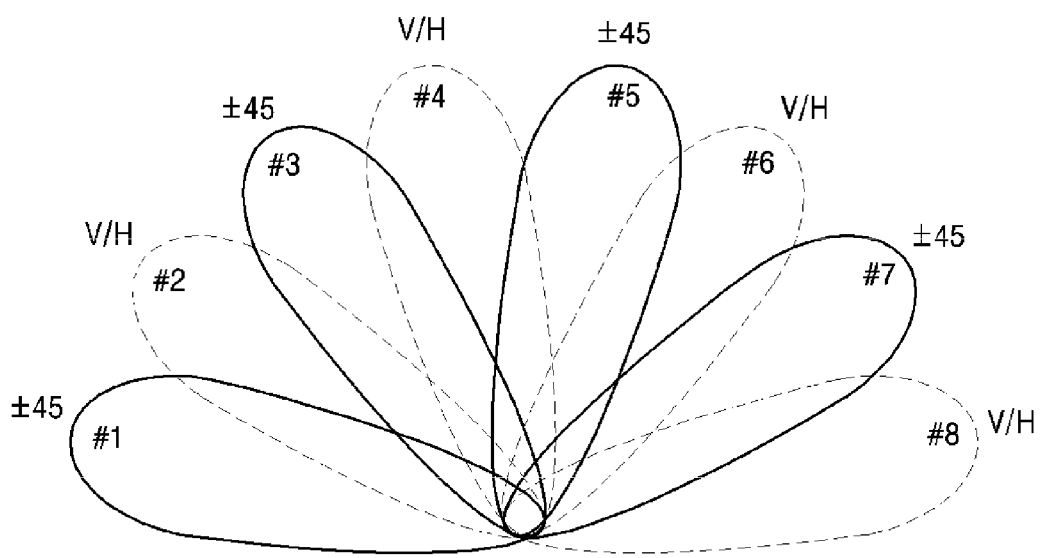
FIG. 3 is a diagram illustrating an example of spatial multiplexing implemented through the present invention.

An example of beams emitted according to the spatial multiplexing method of the present invention is shown in FIG. 3. In FIG. 3, solid-line beams (beam #1, beam #3, beam #5, and beam #7) have polarization orientations of ±45 (orthogonal cross-polarization), and broken-line beams (beam #2, beam #4, beam #6, and beam #8) have vertical/horizontal (V/H) polarization orientations (orthogonal V/H polarization).

When beam #1 uses orthogonal cross-polarization (±45), beam #2 uses V/H polarization. Likewise, beam #3 uses orthogonal cross-polarization (±45), and beam #4 uses V/H polarization.

In other words, according to the present invention, adjacent beams do not use the same type of polarization and use different polarizations (different types of polarizations) so that a correlation coefficient between adjacent beams can be reduced. Also, as different types of polarizations, any types of polarizations which are orthogonal to each other, such as left-circular polarization/right-circular polarization, may be used.

Since beam #1 having orthogonal cross-polarization (±45) and beam #2 having V/H polarization have different polarizations, the correlation between beam #1 and beam #2 may be sufficiently low. Also, beam #1 and beam #3 having orthogonal cross-polarization (±45) are far enough apart, the correlation between beam #1 and beam #3 may be sufficiently low.

According to an embodiment, the process S250 of converting polarizations of the signals and the process S260 of mapping the modulation symbols to resource elements may be performed in different order. For example, 1) the process S250 of converting polarizations of the signals may be performed first, and then the process S260 of mapping the modulation symbols to resource elements may be performed, or 2) the process S260 of mapping the modulation symbols to resource elements may be performed first, and then the process S250 of converting polarizations of the signals may be performed.

In the case of 1), the multi-polarization synthesis unit 130 may convert the polarization of the precoded signal into a different type of polarization, and the resource element mapping unit (not shown) may map the signal whose polarization has been converted to a resource element. In the case of 2), the resource element mapping unit (not shown) may map the precoded signal to a resource element, and the multi-polarization synthesis unit 130 may convert the polarization of the signal mapped to the resource element into a different type of polarization.

Figure 4:
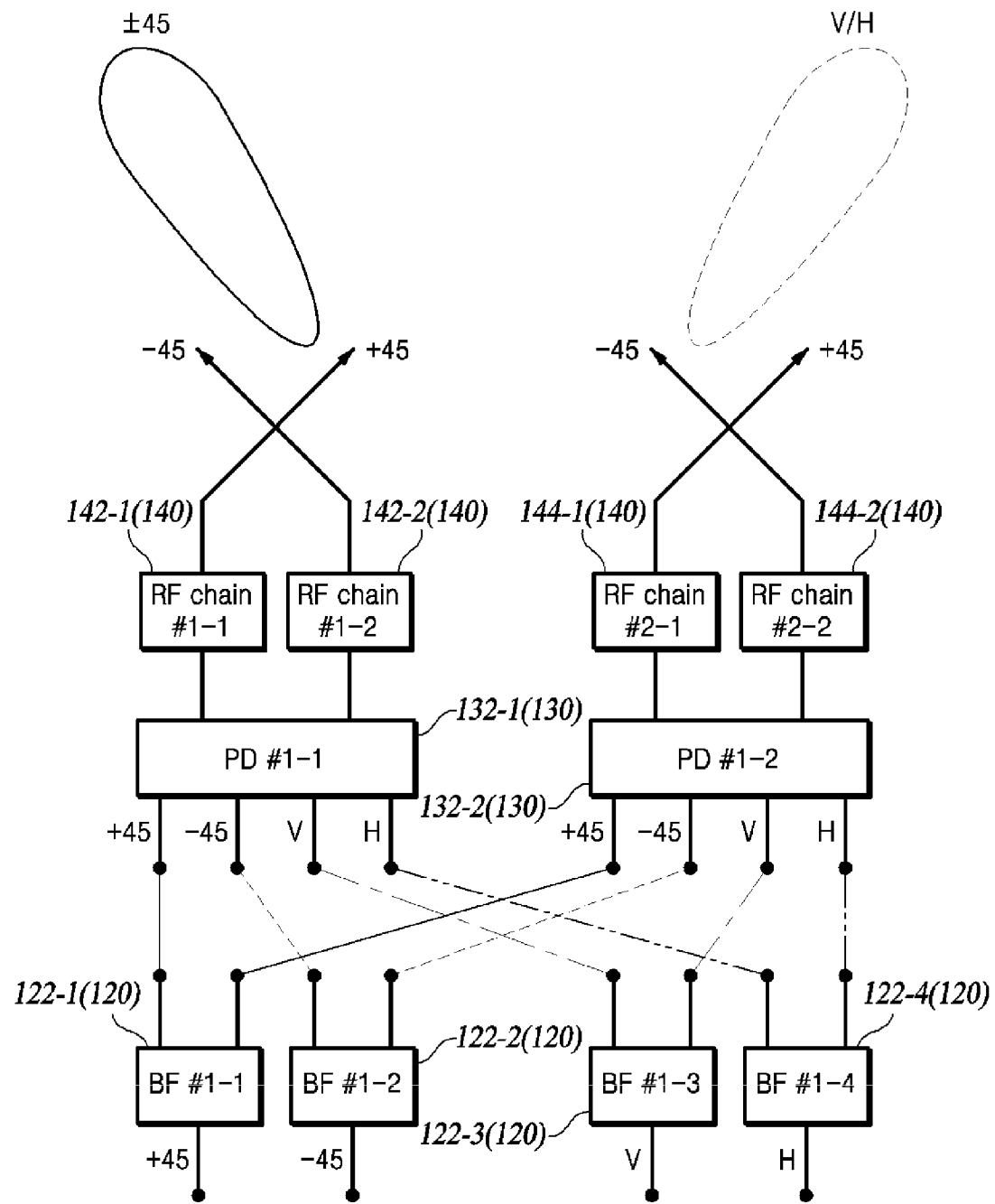
FIG. 4 is a block diagram illustrating an example of a spatial multiplexing apparatus for implementing technologies of the present disclosure.

A spatial multiplexing method using two beams (a first beam and a second beam) will be described below with reference to FIG. 4. The first beam and the second beam are assumed to have different phases (the first beam: a first phase, the second beam: a second phase), neighbor each other, and have different polarizations (the first beam: ±45 degrees, the second beam: V/H polarization).

In the case of emitting the first beam and the second beam through the RF chains 140, the control unit 110 may differently determine phases of the first beam and the second beam and differently determine polarizations of the first beam and the second beam.

The beamforming units 120 may apply a weight vector to a baseband signal so that the first beam and the second beam may have the phases determined by the control unit 110.

For example, beamforming unit #1-1 (BF #1-1, 122-1), beamforming unit #1-2 (BF #1-2, 122-2), beamforming unit #1-3 (BF #1-3, 122-3), and beamforming unit #1-4 (BF #1-4, 122-4) may set a phase of the signal to the first phase and output the signal to multi-polarization synthesis unit #1-1 (PD #1-1, 132-1). Also, beamforming unit #1-1 (BF #1-1, 122-1), beamforming unit #1-2 (BF #1-2, 122-2), beamforming unit #1-3 (BF #1-3, 122-3), and beamforming unit #1-4 (BF #1-4, 122-4) may set a phase of the signal to the second phase and output the signal to multi-polarization synthesis unit #1-2 (PD #1-2, 132-2).

The multi-polarization synthesis units 130 may convert polarizations of the precoded signals so that the first beam and the second beam may have the polarizations (different types of polarizations) determined by the control unit 110.

For example, multi-polarization synthesis unit #1-1 (132-1) may convert the polarization of the signal set to the first phase into ±45 degrees, and multi-polarization synthesis unit #1-2 (132-2) may convert the polarization of the signal set to the second phase into V/H polarization.

The signal having (set to) the first phase and the polarization of ±45 degrees may be emitted as the first beam through RF chain #1-1 (142-1) and RF chain #1-2 (142-2), and the signal having (set to) the second phase and V/H polarization may be emitted as the second beam through RF chain #1-3 (142-3) and RF chain #1-4 (142-4).

As the orthogonal polarization antenna modules included in the RF chains 140, antenna modules arranged at +45 degrees and −45 degrees are represented in this specification. However, various forms of antenna modules, such as orthogonal polarization antenna modules which are vertically and horizontally arranged, may be used in the present invention as long as the antennas are arranged to be orthogonal to each other.

A spatial multiplexing method for a transmission signal has been described above. A spatial multiplexing method for a reception signal may be performed in the reverse order of the spatial multiplexing method for a transmission signal.

Figure 5:
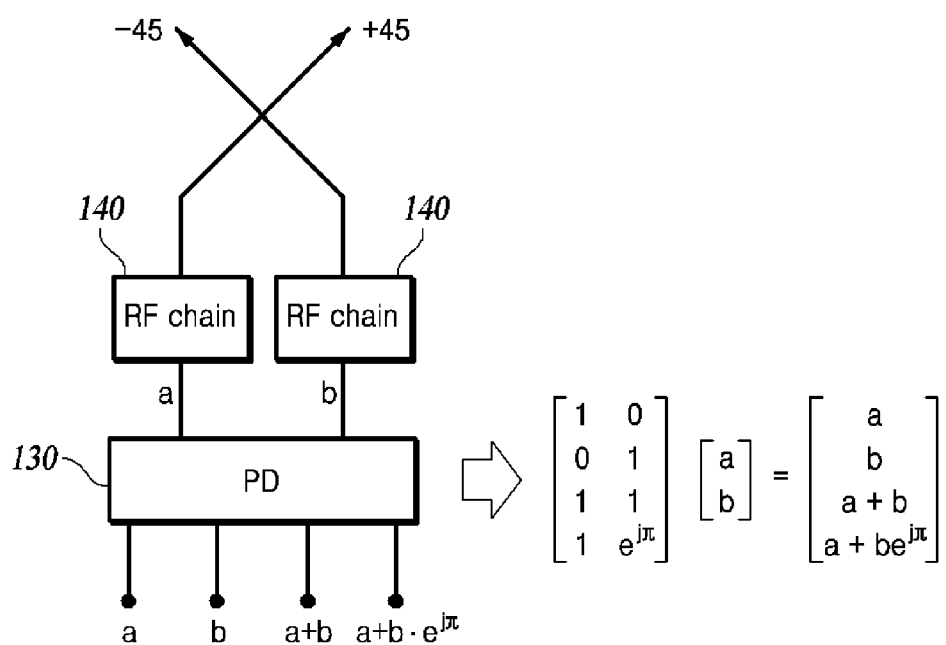
FIG. 5 is a block diagram illustrating multi-polarization synthesis of the present invention.

A polarization conversion method of the present invention will be described below with reference to FIG. 5.

As described above, the multi-polarization synthesis unit 130 may convert polarization of a precoded signal into a different type of polarization. Here, the different type of polarization may include orthogonal cross-polarization (±45) and orthogonal V/H polarization.

A process of converting the polarization of the signal into the different type of polarization may be implemented through Equation 1 below.

$$\begin{bmatrix} 1 & 0 \\ 0 & 1 \\ 1 & 1 \\ 1 & e^{j\pi} \end{bmatrix} \begin{bmatrix} a \\ b \end{bmatrix} = \begin{bmatrix} a \\ b \\ a+b \\ a+be^{j\pi} \end{bmatrix} \qquad \text{[Equation 1]}$$

In Equation 1, a and b represent any one of orthogonal cross-polarization (±45) and orthogonal V/H polarization, a+b and a+be^{jπ} represent the other one of orthogonal cross-polarization (±45) and orthogonal V/H polarization, and $$\begin{bmatrix} 1 & 0 \\ 0 & 1 \\ 1 & 1 \\ 1 & e^{j\pi} \end{bmatrix}$$

represents a polarization decomposition (PD) matrix.

For example, when the PD matrix is applied to +45 degree polarization (a) and −45 degree polarization (b), +45 degree polarization (a) and −45 degree polarization (b) may be converted into +45 degree polarization (a) and −45 degree polarization (b) and vertical polarization (a+b) and horizontal polarization (a+be^{jπ}), that is, different types of polarizations.

Although it has been described with reference to FIG. 2 that the processes S210 to S270 are sequentially performed, this is merely an illustrative description of the technical spirit of an embodiment of the present invention. In other words, those of ordinary skill in the technical field to which the embodiment of the present invention pertains can make various modifications and alterations by performing the processes S210 to S270 in a different order than illustrated in FIG. 2 or performing one or more of the processes S210 to S270 in parallel without departing from the essential characteristics of the embodiment of the present invention. Accordingly, FIG. 2 is not limited to a time-series order.

Figure 2:
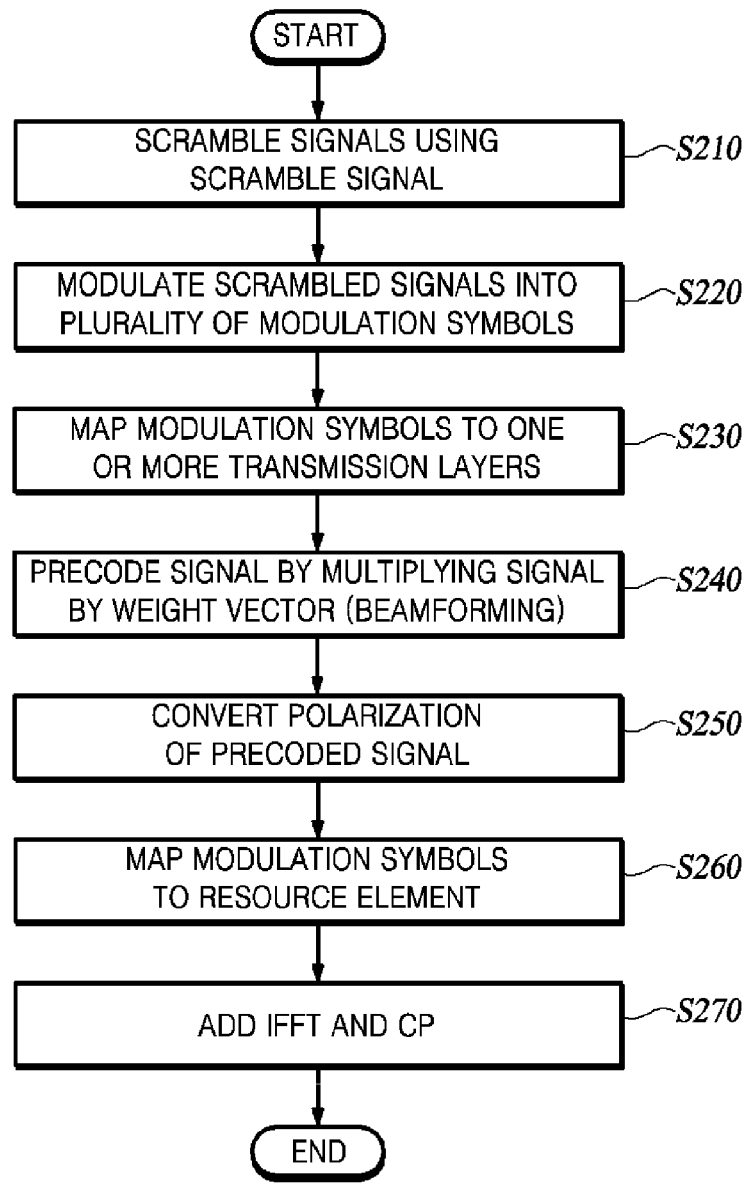
FIG. 2 is a flowchart illustrating a spatial multiplexing method of the present invention.

Meanwhile, the processes illustrated in FIG. 2 can be implemented as computer-readable code on a computer-readable recording medium. The computer-readable recording medium includes any type of recording medium storing data which can be read by a computer system. In other words, the computer-readable recording medium includes a storage medium such as a magnetic storage medium (e.g., a read-only memory (ROM), a floppy disk, a hard disk, etc.), an optical medium (e.g., a compact disc (CD)-ROM, a digital versatile disc (DVD), etc.), and carrier waves (e.g., transmission through the Internet). Also, the computer-readable recording medium may be distributed to computer systems connected via a network so that the computer-readable code may be stored and executed in a distributed manner.

The above description is merely illustrating the technical spirit of the present embodiments, and those of ordinary skill in the art should be able to make various modifications and alterations without departing from the essential characteristics of the present embodiments. Therefore, the embodiments are intended not to limit but to illustrate the technical spirit of the present embodiments, and the technical scope of the present embodiments is not limited by the embodiments. The scope of the present embodiments should be construed on the basis of the following claims, and all the technical spirit within a scope equivalent to the claims should be construed as falling into the scope of the present embodiments.

What is claimed is:

1. A spatial multiplexing method using polarization in a multi-beam system, the method comprising:
    determining different phases for forming a first beam and a second beam spatially adjacent to each other, and determining different orthogonal polarizations to be applied to the first beam and the second beam, wherein the orthogonal polarization to be applied to the first beam is different from the orthogonal polarization to be applied to the second beam;
    precoding a signal so that the first beam and the second beam have the determined different phases; and
    converting polarization of the precoded signal so that the first beam and the second beam have the determined different orthogonal polarizations,
    wherein the converting of the polarization of the precoded signal comprises converting the polarization of the precoded signal into orthogonal cross-polarization (±45 degrees) and orthogonal vertical/horizontal polarization using the following equation:

$$\begin{bmatrix} 1 & 0 \\ 0 & 1 \\ 1 & 1 \\ 1 & e^{j\pi} \end{bmatrix} \begin{bmatrix} a \\ b \end{bmatrix} = \begin{bmatrix} a \\ b \\ a+b \\ a+be^{j\pi} \end{bmatrix},$$

where a and b represent any one of the orthogonal cross-polarization (±45 degrees) and the orthogonal vertical/horizontal polarization, and a+b and a+be^{jπ} represent the other one of the orthogonal cross-polarization (±45 degrees) and the orthogonal vertical/horizontal polarization.

2. The spatial multiplexing method of claim 1, further comprising mapping the precoded signal to a resource element,
    wherein the converting of the polarization of the precoded signal comprises converting the polarization of the signal mapped to the resource element.

3. The spatial multiplexing method of claim 1, further comprising mapping the signal whose polarization has been converted to a resource element.

4. A spatial multiplexing apparatus using polarization in a multi-beam system, comprising:
    a control unit configured to determine different phases for forming a first beam and a second beam spatially adjacent to each other, and determine different orthogonal polarizations to be applied to the first beam and the second beam, wherein the orthogonal polarization to be applied to the first beam is different from the orthogonal polarization to be applied to the second beam;
    a beamforming unit configured to precode a signal so that the first beam and the second beam have the determined different phases; and
    a multi-polarization synthesis unit configured to convert polarization of the precoded signal so that the first beam and the second beam have the determined different orthogonal polarizations,
    wherein the multi-polarization synthesis unit converts the polarization of the precoded signal into orthogonal cross-polarization (±45 degrees) and orthogonal vertical/horizontal polarization using the following equation:

$$\begin{bmatrix} 1 & 0 \\ 0 & 1 \\ 1 & 1 \\ 1 & e^{j\pi} \end{bmatrix} \begin{bmatrix} a \\ b \end{bmatrix} = \begin{bmatrix} a \\ b \\ a+b \\ a+be^{j\pi} \end{bmatrix},$$

where a and b represent any one of the orthogonal cross-polarization (±45 degrees) and the orthogonal vertical/horizontal polarization, and a+b and a+be^{jπ} represent the other one of the orthogonal cross-polarization (±45 degrees) and the orthogonal vertical/horizontal polarization.

5. The spatial multiplexing apparatus of claim 4, further comprising a resource element mapping unit configured to map the precoded signal to a resource element,
    wherein the multi-polarization synthesis unit converts the polarization of the signal mapped to the resource element.

6. The spatial multiplexing apparatus of claim 4, further comprising a resource element mapping unit configured to map the signal whose polarization has been converted to a resource element.

7. A spatial multiplexing apparatus using polarization in a multi-beam system, comprising:
    a control unit configured to determine different phases and different polarizations to be applied to a first beam and a second beam;
    a beamforming unit configured to precode a signal so that the first beam and the second beam have the determined different phases; and
    a multi-polarization synthesis unit configured to convert polarization of the precoded signal so that the first beam and the second beam have the determined different polarizations, wherein the multi-polarization synthesis converts the polarization of the precoded signal into orthogonal cross-polarization (±45 degrees) and orthogonal vertical/horizontal polarization using the following equation:

$$\begin{bmatrix} 1 & 0 \\ 0 & 1 \\ 1 & 1 \\ 1 & e^{j\pi} \end{bmatrix} \begin{bmatrix} a \\ b \end{bmatrix} = \begin{bmatrix} a \\ b \\ a+b \\ a+be^{j\pi} \end{bmatrix},$$

where a and b represent any one of the orthogonal cross-polarization (±45 degrees) and the orthogonal vertical/horizontal polarization, and a+b and a+be$^{j\pi}$ represent the other one of the orthogonal cross-polarization (±45 degrees) and the orthogonal vertical/horizontal polarization.

8. The spatial multiplexing apparatus of claim 7, further comprising a resource element mapping unit configured to map the precoded signal to a resource element.

9. The spatial multiplexing apparatus of claim 8, wherein the multi-polarization synthesis unit converts the polarization of the signal mapped to the resource element.

10. The spatial multiplexing apparatus of claim 7, further comprising a resource element mapping unit configured to map the signal whose polarization has been converted to a resource element.

\* \* \* \* \*